United States Patent Office
3,400,688
Patented Sept. 10, 1968

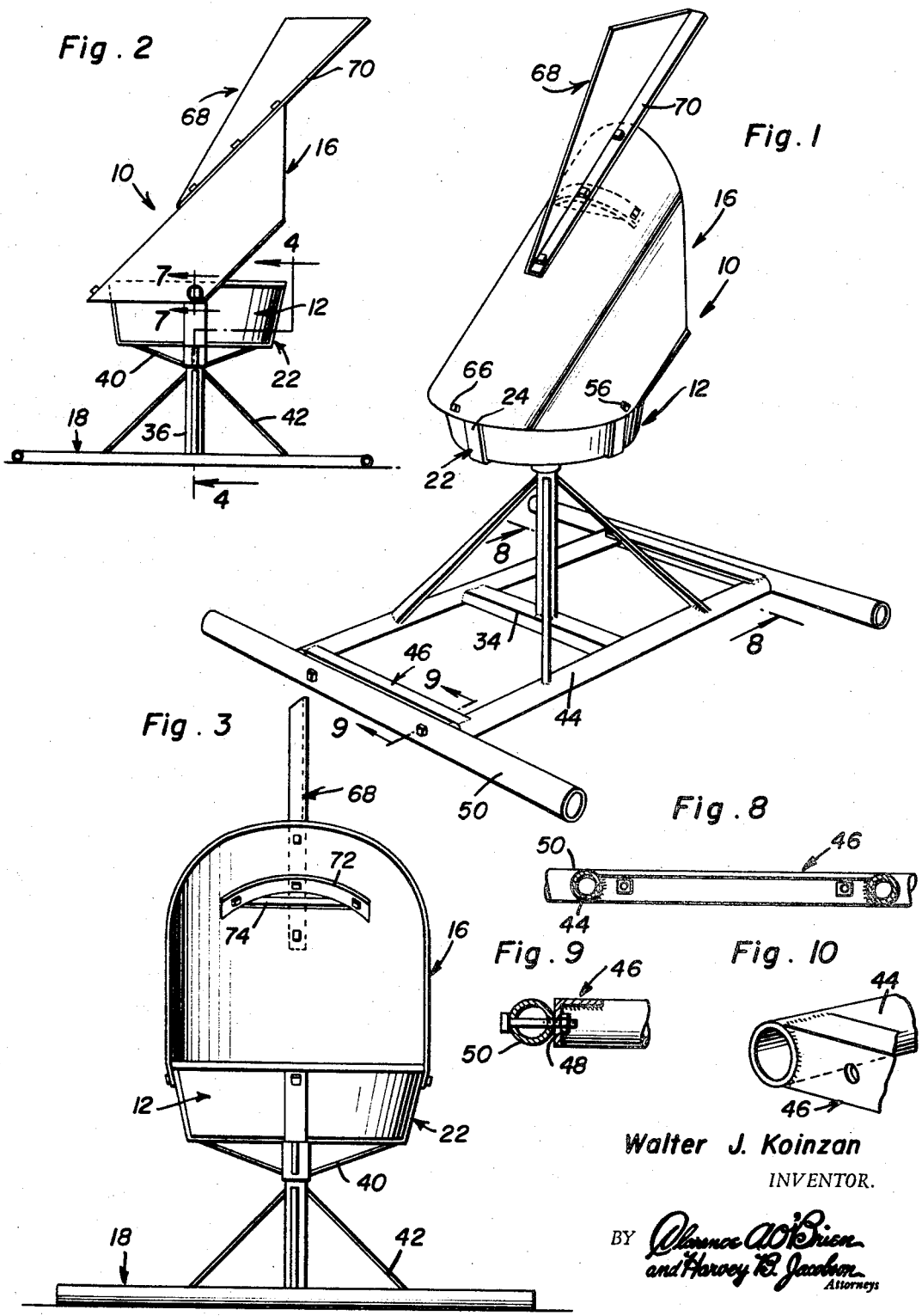

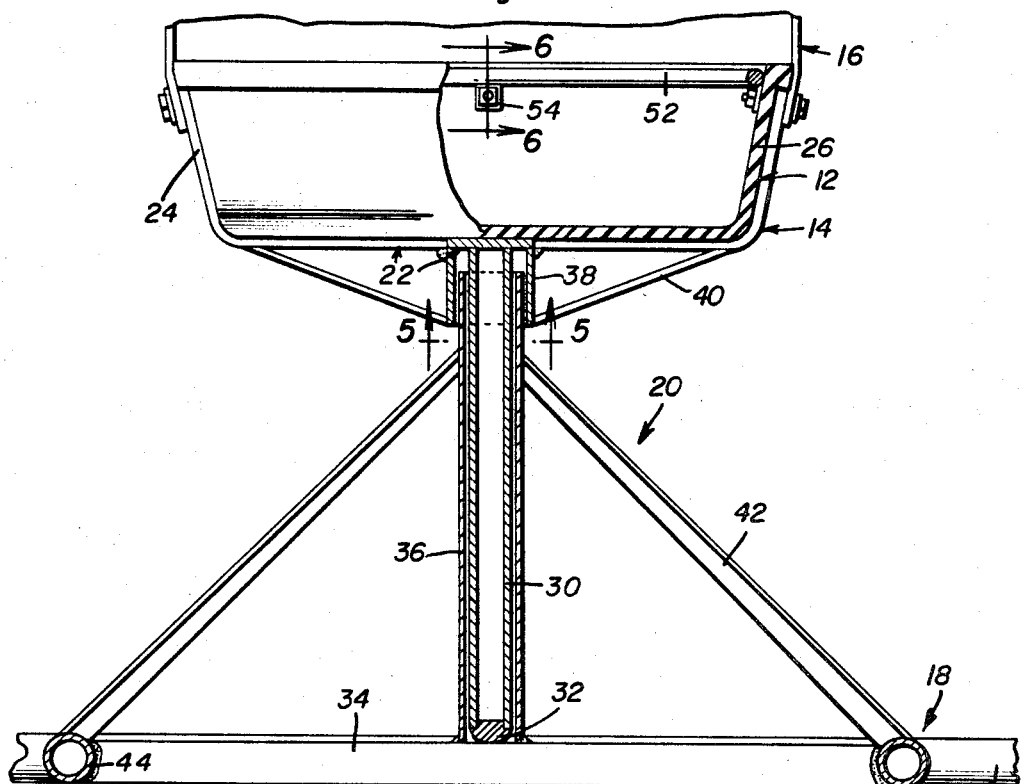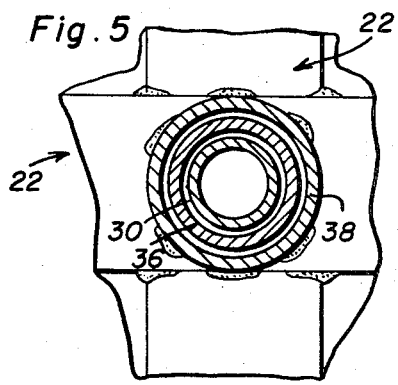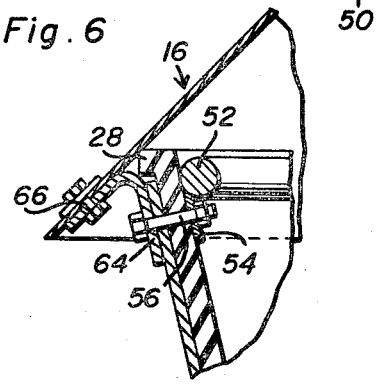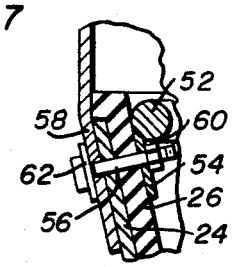

3,400,688
LIVESTOCK FEEDER
Walter J. Koinzan, Elgin, Nebr. 68636
Filed June 9, 1966, Ser. No. 556,314
8 Claims. (Cl. 119—51)

ABSTRACT OF THE DISCLOSURE

A feed container received within a support cradle rotatably mounted on an upright pedestal, a protective hood extending over the container. The hood, container and cradle are interlocked by bolts extending therethrough with the container being constructed of a resiliently compressible material which acts in the nature of a resilient mount for the hood so as to provide a shock absorbing effect tending to reduce damage to the hood by livestock coming in contact therewith.

---

The instant invention is concerned with the feeding of livestock, and more particularly is concerned with a pedestal-type feeder for use in the dispensing of salt, minerals, or the like.

It is a significant object of the invention to provide a compact feeding unit which is constructed so as to allow for free access to the contents thereof by the livestock, while at the same time providing for an effective protection of the feed or the like from adverse weather conditions.

In conjunction with the above object, it is an object of this invention to provide a feeder wherein the container portion thereof is rotatably mounted so as to constantly maintain the access side thereof leeward in a rain and wind excluding orientation.

Another significant object of the instant invention is to provide a feeder wherein the various elements thereof are engaged with each other so as to form a compact long-lasting device incorporating both shock absorbing and transporting features.

In addition, it is a significant object of the instant invention to provide a rotatably mounted feeder wherein the orientation of the feeder is, through an enlarged wind-catching vane, automatically responsive to the prevailing winds so as to assume the proper rotational position.

Basically, the above objects are obtained through the provision of an enlarged fiber reinforced rubber container mounted upon a pair of crossed rigid straps which are in turn rotatably mounted upon a suitable drag base. An enlarged protective hood is provided arcuately over the container in a manner so as to allow for free access to the container while at the same time protectively enclosing the container. The hood is to be mounted in a manner whereby the resilient nature of the fabric reinforced rubber container is utilized in introducing a shock absorbing mount for the hood, with the container itself being reinforced about the upper edge thereof through a rigid encircling rod positioned therein. Finally, an enlarged outwardly and upward projecting vane is mounted directly on the hood so as to effect a rotation of the hood, container and supporting straps, relative to the stabilizing base.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the feeder of the instant invention;

FIGURE 2 is a reduced side elevational view of the feeder;

FIGURE 3 is a front elevational view of the feeder;

FIGURE 4 is an enlarged detail view taken substantially on a plane passing along line 4—4 of FIGURE 2;

FIGURE 5 is an enlarged cross-sectional detail taken substantially on a plane passing along line 5—5 of FIGURE 4;

FIGURE 6 is an enlarged cross-sectional detail taken substantially on a plane passing along line 6—6 of FIGURE 4 and illustrating the manner in which the rear portion of the hood is to be mounted;

FIGURE 7 is an enlarged cross-sectional detail taken substantially on a plane passing along line 7—7 of FIGURE 2 and illustrating the side mount for the hood;

FIGURE 8 is a cross-sectional detail taken substantially on a plane passing along line 8—8 in FIGURE 1;

FIGURE 9 is a cross-sectional detail taken substantially on a plane passing along line 9—9 of FIGURE 1; and FIGURE 10 is a perspective detail of one corner of the base prior to a mounting of the transverse end pipe.

Referring now more specifically to the drawings, reference numeral 10 is used to generally designate the feeder comprising the instant invention. This feeder 10 consists basically of a feed container or tub 12, a container mounting cradle 14, a cradle protecting hood 16, an enlarged supporting base 18, and a pedestal unit 20 rotatably mounting the cradle supported container 12 on the base 18.

The cradle 14 is formed by means of three elongated flat rigid straps 22 which are rigidly fixed, as by welding, so as to define four equal length radially extending support arms, the outer end portions 24 of which are upwardly and outwardly angled so as to define retainers for the annular wall 26 of the container or feed tub 12, the bottom of which sits on the crossed horizontal portions of the cradle straps 22.

The container 12 itself is preferably constructed of a fabric reinforced rubber possessing a degree of resiliency and being of a corrosive resistant nature. The annular side wall 26 of the container 12 terminates, at its upper edge, in an outwardly directed reinforcing flange 28 which engages over the upper extremities of the upwardly angled arm end portions 24, thereby helping to properly position the container 12 within the cradle 14.

The pedestal portion 20 of the feeder 10 includes an elongated cylindrical member or tube 30 rigidly welded to the center of the bottom of the cradle 14 and depending vertically therefrom for engagement, through a solid rounded foot 32, with a cross-bar 34 of the base 18. A second elongated tubular member or pipe 36 surrounds the member 30 in outwardly spaced relation therewith so as to allow for a free rotational movement of the member 30 within the member 36. This member 36 is rigidly affixed, as by welding, to the cross-brace 34 and projects vertically therefrom to a height terminating below the upper end of the member 30 so as to contain the member 30 without interfering with the free engagement of the rounded foot 32 of this member with the cross-brace 34. It is contemplated that grease be supplied within the tube 36 so as to facilitate the free and substantially frictionless rotation of the member 30 therein. The upper end of the tube 36 is in turn freely enclosed within a depending enlarged tubular stub 38 welded to the center of the bottom of the cradle concentrically with the member 30 and depending therefrom to a point sufficiently below the upper end of the tube 36 so as to form a protective enclosure therefor, whereby dirt and moisture is effectively excluded and the grease retained, this in turn providing a permanent lubrication for the rotating member 30. As will be appreciated from the drawings, elongated braces 40 can be provided from the lower end of the tubular stub 38 to each of the cradle arms at the end of the horizontal portion thereof. In addition, suitable rigid braces 42 can also be utilized between the tube 36, immediately below the lower end of the tubular stub 38, and a pair of longitudinally extending pipes 44 constituting a portion of the base 18.

With specific reference to the base 18, it will be noted that the pipes 44, in addition to being interconnected by the transversely extending brace member 34, also have the corresponding ends thereof interconnected by a pair of transversely extending angle bars 46 welded thereto, these angle bars 46 in turn having a downwardly directed vertical leg or flange 48 thereof bolted to a pair of elongated transversely extending pipes 50. This use of elongated pipes in the construction of the base 18 is considered of significance in that a maximum amount of strength is obtained in addition to the fact that the rounded surfaces of the pipes 50 and 44 facilitate the sliding of the feeder 10 over the ground as might be desired in moving the feeder 10 from one location to another.

Turning again to the container 12 it will be noted that an annular rod 52 has been provided about the inner surface of the upper edge thereof, this rod 52 introducing an extra degree of rigidity into the container in a manner which both strengthens the container and helps to maintain its shape. The rod 52 is releasably fixed into position through the provision of four depending tabs 54 welded to the rod 52 and lying against the inner surface of the container wall 26 at four points corresponding to the four upwardly angle arm portions 24 for the reception of mounting bolts therethrough.

The hood 16 has an arcuate configuration with a lower edge portion that surrounds approximately one-half of the cradle mounted container 12. This hood, as will be appreciated from the drawings, projects upwardly and forwardly so as to in fact overlie the entire container 12 in spaced relation thereabove while at the same time presenting an enlarged open forward end so as to enable easy access to the contents of the container 12 by the various livestock using the device. The hood 16 is secured to the cradle 14 at three points on three of the cradle arm end portions 24. The mounting of the hood is effected through elongated bolts 56, which in the case of the diametrically opposed sides of the hood 16, extend through the hood wall 58, the adjoining arm end portion 24, the container wall 26, and the corresponding rod tab 54, after which a suitable nut 60 is threadedly engaged with the bolt 56 so as to effectively clamp these elements together. It will of course be appreciated that washers 62 may be provided as needed. The mounting of the central rear portion of the hood 16, noting FIGURE 6, differs from the side mounts of the hood 16 in that an angular bracket 64 is utilized, this bracket having one leg thereof engaged with the bolt 56 while the other leg thereof is fixedly bolted to the undersurface of the overhanging rear portion of the hood by a bolt and nut unit 66. In each instance, it will be recognized that a portion of the annular wall of the container 12 is interposed. The significance of this is that, aside from effecting a positive positioning and retaining of the container, a shock absorbing mount is provided for the hood itself. This arises from the resilient cushioning nature of the material of the container itself, this in turn tending to minimize the possibility of breakage or damage to the hood due to the constant flexing and bending thereof caused by the livestock rubbing and pushing on the feeder and the various portions thereof. As will be appreciated, were the joint between the hood and cradle to be completely rigid, the likelihood of breakage or damage occurring would be greatly increased, this in turn destroying the effectiveness of the feeder 10 as a device for protecting as well as dispensing the feed, minerals, salt or the like. Incidentally, with further reference to the hood 16, it will be noted that this hood is in effect defined by a single flat sheet of metal arcuately formed so as to produce a tunnel-like closure or shield which in turn combines a fully protective covering for the container 12 and an easily accessible open end at an inclination which would provide little or no hinderance to the free access to the material within the container 12. In using common bolt means for the hood 16 and rod 52 at three points, the hood and rod are drawn together so as to clamp the container wall against the hood. The importance of this resides in the fact that the tight fit of the hood to the container keeps the livestock from pushing the feed over the back of the container. By the same token, the tight fit keeps rain, snow, dirt, etc. from blowing into the container from the windward side thereof.

The feeder 10 of the instant invention is specifically intended to revolve in response to the wind so as to constantly present the open end of the shield or hood 16 leeward, thereby substantially excluding rain, wind, or the like, such as might have a detrimental effect on the feed. This automatic revolving of the hood, container and cradle unit is effected through the provision of an enlarged wind vane 68, this vane having a laterally directed flange 70 thereon which is bolted to the upper portion of the hood 16 along the center line thereof in a manner whereby the vane and flange project longitudinally upwardly and forwardly from the hood. In this position, it will be appreciated that the vane 68, while being readily accessible to any wind which might be present, is completely out of the path of movement of the livestock as they approach the material within the container 12. Incidentally, it is also contemplated that the hood 16 be braced and rigidified below the vane 68, this being effected by an arcuate rigid strap or bar 72 bolted to the interior of the hood 16 at a point corresponding to approximately the mid-point of that portion of the vane 68 engaged with the hood. This bar 72 can be, if so desired, further rigidified through the addition of a small rigid cross-brace 74 welded thereto.

From the foregoing, it should be recognized that a highly novel livestock feeder has been defined. This feeder, automatically rotatable so as to protect the material from the elements, is uniquely adapted, through the hood arrangement and stress absorbing construction thereof, for use under the normally adverse conditions to which such feeders are subjected, including not only inclement weather, but also the constant abuse to which a feeder can be expected to be subjected by the animals themselves coming into contact therewith.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A livestock feeder comprising a support cradle, an enlarged base, pedestal means rotatably mounting said cradle on said base, a container supported within said cradle, hood means overlying and shielding said container in spaced relation thereabove, and common means securing said container and said hood means to said cradle, said container being of a resiliently compressible material, said means securing said hood means and container to the cradle comprising elongated bolts engaged through said hood means, cradle, and container so as to clampingly connect these members, said container having an upper portion engaging an inner portion of the hood means providing a seal therebetween, the engaged portions of the container and the clamping connection constituting a resilient shock-absorbing mount for the hood means.

2. The structure of claim 1 wherein said pedestal means comprises a cylindrical member fixed centrally to the bottom of the cradle and depending vertically therebelow, a bearing point on said base rotatably receiving the lower end of said cylindrical member, a tubular member, shorter than said cylindrical member, fixed to said base and projecting upwardly therefrom in free surrounding relation to said cylindrical member, and a tubular stub fixed to the bottom of the cradle concentric with the cylindrical member, said tubular stub depending vertically to a point below the upper end of the tubular member in free surrounding relation thereto.

3. The structure of claim 1 wherein said hood means is arcuately formed and includes a lower edge portion encircling and substantially engaging approximately one-half of the circumference of the container, said hood means extending upwardly at an angle from said lower edge into overlying relation relative to the entire container.

4. The structure of claim 3 including a vertically directed wind vane fixed longitudinally along the center line of the arcuate hood means and projecting forwardly beyond the upper edge thereof.

5. The structure of claim 3 wherein said cradle comprises flat rigid straps fixed to each other so as to define four radially extending equal length arms, said arms each terminating in upwardly and outwardly inclined positions.

6. The structure of claim 5 including a rigid annular rod positioned within the upper end of the container and engaged therewith, said rod having a plurality of depending tabs thereon at spaced points thereabout corresponding to the upwardly and outwardly inclined portions, said bolts extending through said portions and said tabs so as to mount said rod.

7. A livestock feeder comprising a support cradle, an enlarged base, means mounting said cradle on said base, said cradle comprising flat rigid straps fixed to each other so as to define a plurality of radially extending generally equal length arms, said arms terminating in upwardly and outwardly inclined portions, a container received within and supported by said arms, said container being of a resiliently compressible material and including a peripheral wall lying against said arms, hood means overlying and shielding said container in spaced relation thereabove, and common fastener means engaged with said hood means, cradle arms and resiliently compressible container so as to clampingly connect these members, said container having an upper edge portion engaging an inner portion of the hood means providing a seal therebetween, the engaged portions of the container and the clamping connection providing a resilient shock-absorbing mount for the hood means.

8. The structure of claim 7 wherein said common fastener means comprise elongated bolts each extending through the hood means, a cradle arm, and the container.

References Cited

UNITED STATES PATENTS

| | | | |
|---|---|---|---|
| 1,796,466 | 3/1931 | Lage | 119—51 |
| 2,682,255 | 6/1954 | Kleeman | 119—51 |
| 2,691,958 | 10/1954 | Lage | 119—51 |
| 3,205,861 | 9/1965 | Moore | 119—61 |

HUGH R. CHAMBLEE, *Primary Examiner.*